United States Patent
Koara

(10) Patent No.: US 8,707,423 B2
(45) Date of Patent: Apr. 22, 2014

(54) PROGRAMMABLE DISPLAY DEVICE, AND CONTROL SYSTEM

(75) Inventor: Kengo Koara, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 804 days.

(21) Appl. No.: 12/293,286

(22) PCT Filed: Dec. 18, 2007

(86) PCT No.: PCT/JP2007/074331
§ 371 (c)(1),
(2), (4) Date: Sep. 17, 2008

(87) PCT Pub. No.: WO2008/084631
PCT Pub. Date: Jul. 17, 2008

(65) Prior Publication Data
US 2009/0276845 A1    Nov. 5, 2009

(30) Foreign Application Priority Data
Jan. 10, 2007  (JP) .................. 2007-002562

(51) Int. Cl.
H04L 9/32    (2006.01)
(52) U.S. Cl.
USPC ............... 726/19; 700/12; 700/15; 700/86; 726/16; 726/29; 711/162
(58) Field of Classification Search
USPC ........ 726/16, 19, 29; 700/12, 15, 86; 711/162
See application file for complete search history.

(56) References Cited

U.S. PATENT DOCUMENTS

| 4,524,414 | A | * | 6/1985 | Kiyokawa ..................... 700/180 |
| 6,122,741 | A | * | 9/2000 | Patterson et al. ............... 726/17 |
| 6,484,173 | B1 | * | 11/2002 | O'Hare et al. ........................ 1/1 |
| 6,868,495 | B1 | | 3/2005 | Glover |
| 7,010,368 | B2 | * | 3/2006 | Otani et al. ...................... 700/86 |
| 7,200,864 | B1 | * | 4/2007 | Hollingsworth .................. 726/6 |
| 7,978,465 | B2 | * | 7/2011 | Osaka et al. ............. 361/679.22 |
| 8,185,937 | B2 | * | 5/2012 | Hollingsworth .................. 726/6 |
| 2002/0067833 | A1 | | 6/2002 | Han et al. |
| 2003/0144753 | A1 | * | 7/2003 | Otani et al. ...................... 700/87 |
| 2007/0250920 | A1 | * | 10/2007 | Lindsay ............................ 726/7 |

FOREIGN PATENT DOCUMENTS

| DE | 10051645 A1 | 8/2001 |
| EP | 0339115 A1 | 11/1989 |
| JP | 2004-005389 A | 1/2004 |
| JP | 2005-38261 A | 2/2005 |
| JP | 2006-106998 A | 4/2006 |
| JP | 2006-134098 A | 5/2006 |

* cited by examiner

Primary Examiner — Jung Kim
Assistant Examiner — Thomas Ho
(74) Attorney, Agent, or Firm — Sughrue Mion, PLLC; Richard Turner

(57) ABSTRACT

A programmable display device includes a communication driver, a file system process unit that accesses the portable storage medium storing backup/restore target information that includes a target control device and target setting information respectively specifying the control device on which the backup/restore process is performed out of the control devices connected to the programmable display device and setting information, and a setting-information obtaining/writing process unit that accesses the control device via the communication driver based on the backup/restore target information and performs the backup/restore process of the setting information by accessing the portable storage medium via the file system process unit.

11 Claims, 7 Drawing Sheets

PROGRAMMABLE DISPLAY DEVICE, AND CONTROL SYSTEM

TECHNICAL FIELD

The present invention relates to a programmable display device that is connected to a control device such as a programmable controller. Moreover, the present invention relates to a control system to perform a backup/restore process of setting information of the control device that is connected to the programmable display device.

BACKGROUND ART

A programmable controller controls operations of a control target connected thereto by periodically and repeatedly performing sequence programs thereby performing a predetermined process. The sequence programs are stored in a user program storage unit in the programmable controller, and are loaded on a memory in the programmable controller to be executed by an MPU (Micro Processing Unit). The sequence programs may break due to accidental problems. Methods of backing up the sequence programs have been conventionally proposed for preventing breaking of the sequence programs. For example, a conventional technology has been known in which the sequence programs are stored by executing a write command on a management computer or a storage medium, such as a memory, connected to the programmable controller via a communication interface.

The programmable controller is of course used by a user (hereinafter, referred to as an end user); however, normally, a system designer (hereinafter, referred to as a set maker) constructs a system including sequence programs or control parameters that meets the desire of the end user by using the programmable controller manufactured by a manufacturer (hereinafter, referred to as a maker). These sequence programs, or the parameters for operating the constructed system include technical know-how and the like that the set maker would like to keep confidential. Therefore, set makers want to keep the sequence programs or the parameters confidential to prevent unauthorized copying or the like of the sequence programs or the parameters.

Therefore, a technology has been proposed in which unique information of each device for identifying a programmable controller or for protecting each setting information is embedded when sequence programs are saved on a storage medium, a protection key for preventing unauthorized copying is compared with the unique information of each device when the sequence programs are read from the storage medium to the programmable controller, and readout of the sequence programs is allowed only when the unique information matches the protection key (e.g., see Patent Document 1).

Patent Document 1: Japanese Patent Application Laid-open No. 2006-106998

DISCLOSURE OF INVENTION

Problem to be Solved by the Invention

However, in the above Patent Document 1, the sequence programs in the programmable controller are saved and loaded between the programmable controller and a management computer connected to the programmable computer or a storage medium such as a memory card. Generally, a programmable controller does not include a display unit, so that there is a problem that the programmable controller is inferior in operability. Moreover, in the technology in Patent Document 1, there is a problem that a programmable controller can only save sequence programs included in its own programmable controller.

Furthermore, there is no disclosure in Patent Document 1 of the procedure for backing up a plurality of sequence programs or control parameters stored in the programmable controller in a batch, or restoring the plurality of sequence programs or control parameters in a memory in the programmable controller in a batch. These problems can be occur not only in the programmable controller but also in a control device in general such as a CNC (Computer Numerical Control).

The present invention is achieved in view of the above, and an object of the present invention is to provide a programmable display device, and a control system capable of performing a backup/restore process of setting information such as a control program or a control parameter in a batch between a plurality of control devices and a storage medium with good operability. Moreover, another object of the present invention is to provide a programmable display device, and a control system capable of performing a backup/restore process of setting information in a plurality of control devices with good operability while preventing unauthorized use of the setting information that is baked up.

Means for Solving Problem

To achieve the above object, a programmable display device according to the present invention is connected to control devices that store setting information for performing a predetermined control process and perform the control process based on the setting information, and displays a state of the control devices and a display screen including a setting screen for the control devices, and includes a communication process unit that accesses the control devices; a file system process unit that accesses a storage medium that stores therein backup/restore target information including target control device information and target setting information and is built in or detachable from the programmable display device, the target control device information specifying a control device on which a backup/restore process is to be performed out of the control devices connected to the programmable display device, the target setting information specifying setting information on which the backup/restore process is to be performed out of a plurality of pieces of setting information stored in the control device specified in the target control device information; and a setting information obtaining/writing process unit that accesses the control device via the communication process unit based on the backup/restore target information in the storage medium in accordance with a request for performing the backup/restore process from outside, and performs the backup/restore process of the setting information by accessing the storage medium via the file system process unit.

Effect of the Invention

According to the present invention, setting information on a plurality of control devices such as a control program or a control parameter can be backed up with minimum operation while preventing an unauthorized leak of the setting information.

Figure 1:
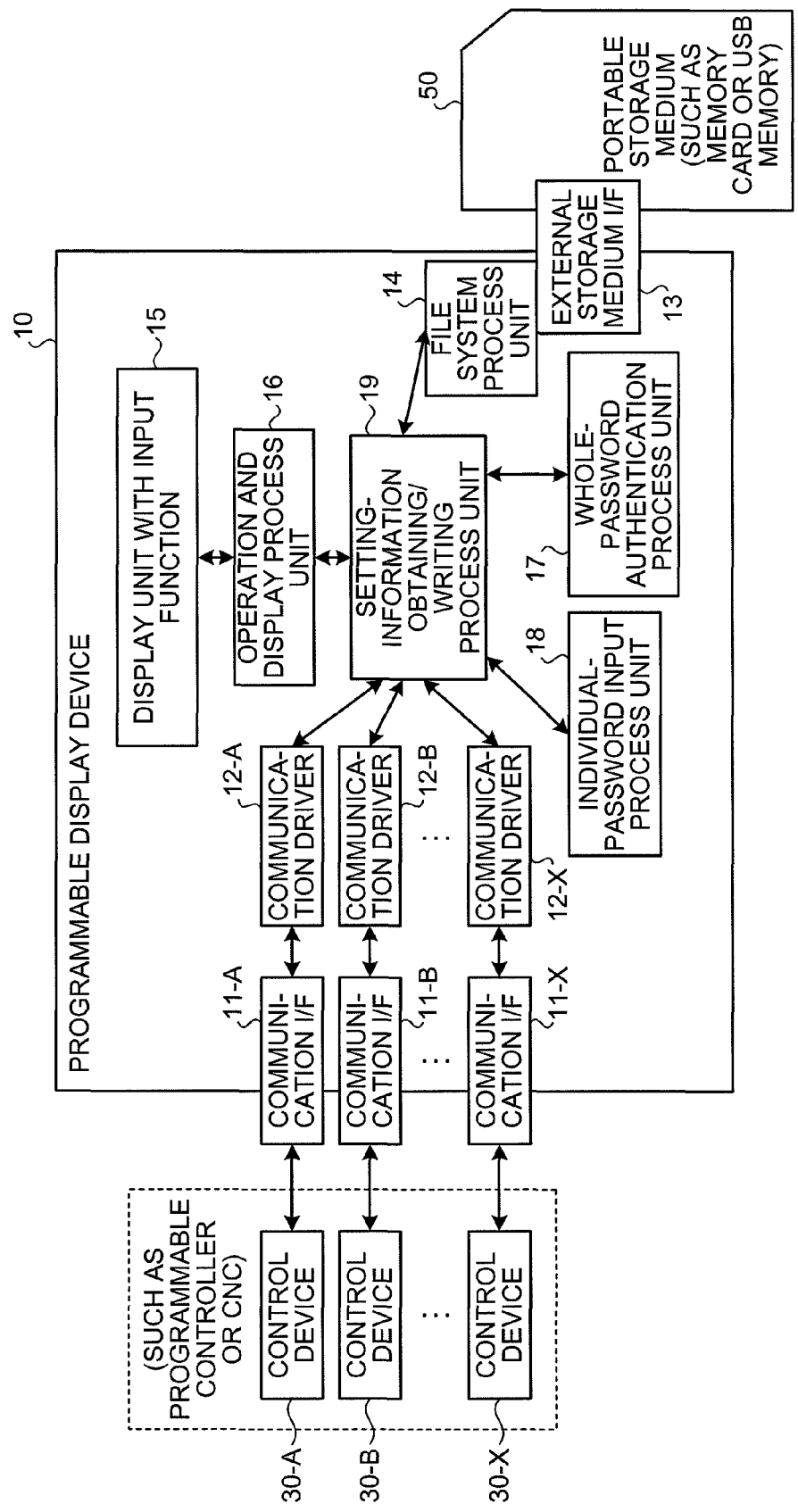
FIG. 1 is a block diagram schematically illustrating a control system that includes a programmable display device according to the present invention.

EXPLANATIONS OF LETTERS OR NUMERALS 10 programmable display device
11-A to 11-X communication interface
12-A to 12-X communication driver
13 external storage medium interface
14 file system process unit
15 display unit with input function
16 operation and display process unit
17 whole-password authentication process unit
18 individual-password input process unit
19 setting-information obtaining/writing process unit
30-A to 30-X control device
50 portable storage medium

BEST MODE(S) FOR CARRYING OUT THE INVENTION

Exemplary embodiments of a programmable display device, and a control system according to the present invention are described in detail below with reference to the accompanying drawings. The present invention is not limited to these embodiments. In the specification, "backup" represents a process of storing information, such as a control program or a control parameter, that are necessary for operations of a control device connected to the programmable display device in a storage medium mounted on the programmable display device. On the other hand, "restore" represents a process of rewriting information on the control program, or the control parameter, recorded in the storage medium by the backup to the control device from the programmable display device to restore the state of the control device to the state at the time of performing the backup process.

FIG. 1 is a block diagram schematically illustrating a control system that includes the programmable display device according to the present invention. The control system includes a programmable display device 10, one or more control devices 30-A to 30-X such as a programmable controller and a CNC, and a portable storage medium 50, such as a memory card, a USB (Universal Serial Bus) flash drive, or a USB memory drive, detachably attachable to the programmable display device 10. Setting information, such a control program and a control parameter, is stored in the control devices 30-A to 30-X. Access to the control devices 30-A to 30-X can be protected, if desired, by device passwords. Assume that access to the control device 30-A is protected by a device password A, while access to the control device 30-B is not limited by the device password. Access to the setting information in the control devices 30-A and 30-B is protected by setting information passwords.

The setting information in the control devices 30-A to 30-X is backed up in the portable storage medium 50. An end user who actually uses the system shown in FIG. 1 backs up the setting information to cope with an occurrence of a failure of the control devices 30-A to 30-X. Consequently, the backed-up setting information is designed, as explained below, in such a manner that the end user can not browse the contents of the individual setting information.

Figure 2:
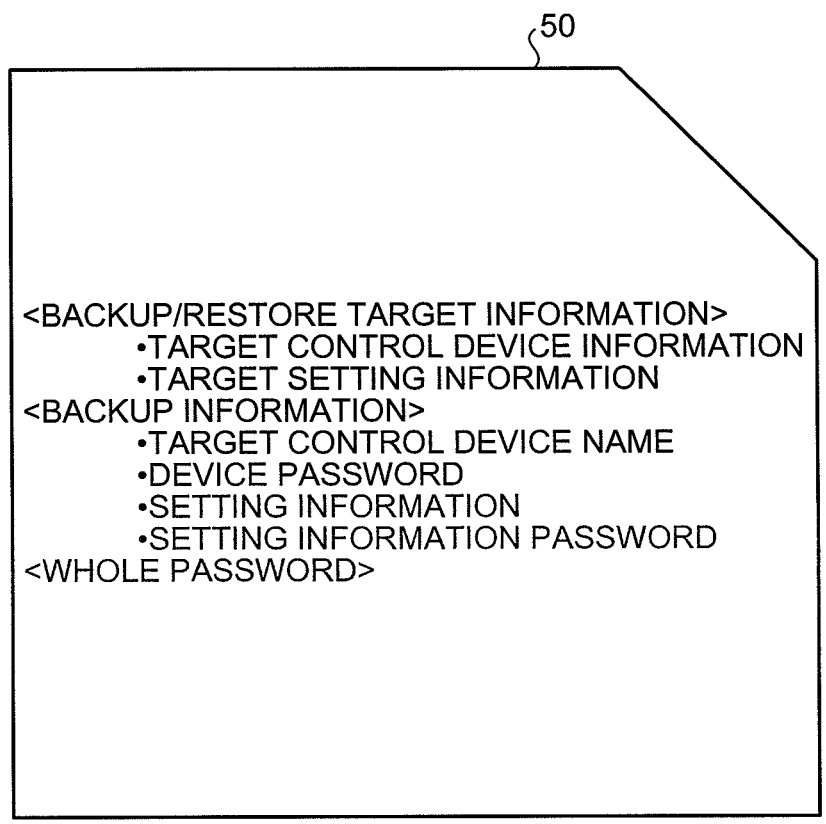
FIG. 2 is a diagram illustrating one example of information stored in a portable storage medium.

FIG. 2 is a diagram illustrating one example of information stored in the portable storage medium. Backup/restore target information, backup information, and a whole password are stored in the portable storage medium 50. The backup/restore target information is information for specifying control devices from which the setting information such as a control program and a control parameter is to be obtained at the time of the backup, and control devices to which the setting information is to be restored at the time of the restoring, out of the control devices 30-A to 30-X. Therefore, the backup/restore target information includes target control device information for specifying target control devices out of the control devices 30-A to 30-X and target setting information that is a list of which piece of setting information in the control devices specified in the target control device information is to be a target for the backup/restore.

The backup information is the setting information on the control devices 30 specified in the backup/restore target information. The backup information includes target control device names for identifying the target control device information specified in the backup/restore target information and device passwords if a device password is set for accessing each target control device. Moreover, the backup information includes encoded setting information that is information specified in the target setting information for each target control device name to be actually backed up and restored and setting information passwords necessary for accessing, the setting information. The backup information is encoded by the whole password for authenticating access to the backup information. In this specification, the device password for accessing the control device 30 and the setting information password for accessing the setting information are classified into an individual password.

The whole password is a password for authenticating access to the encoded backup information.

Figure 3:
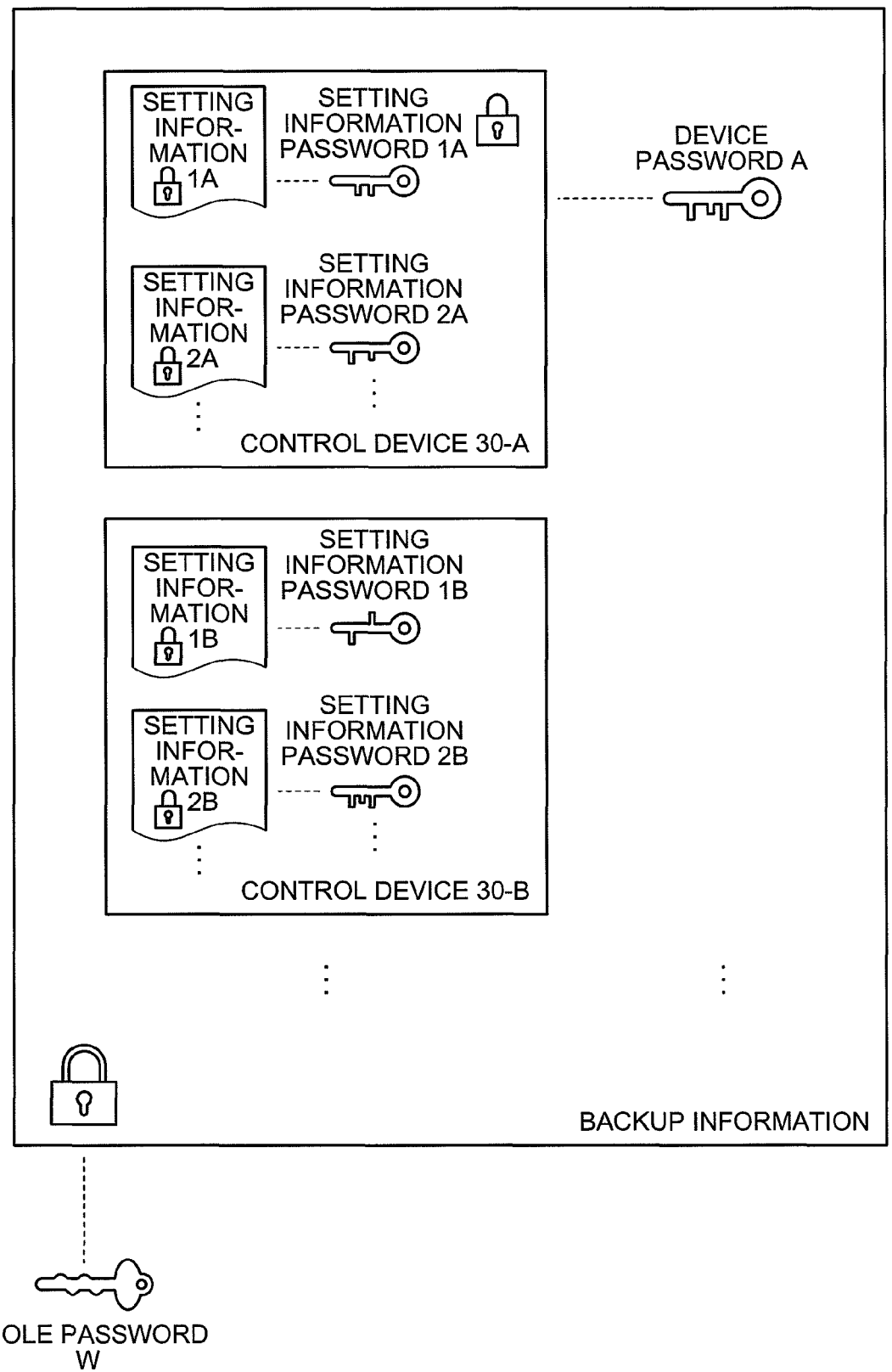
FIG. 3 is a diagram schematically illustrating a relation between backup information and a whole password.

FIG. 3 is a diagram schematically illustrating a relation between the backup information and the whole password. Assume that setting information 1A, 2A, . . . is obtained from the control device 30-A, and setting information 1B, 2B, . . . is obtained from the control device 30-B. As explained above, the access to the control device 30-A is restricted; however, the access to the control device 30-B is not restricted.

As shown in FIG. 3, the backup information is an aggregation of the setting information of the control devices 30 as targets for backup. When authentication is needed to access the control device 30, the device password for the access is stored therein while being associated with the control device 30. Each control device 30 includes one or more pieces of the setting information. In the example shown in FIG. 3, each piece of the setting information on the control devices 30-A and 30-B is associated with the setting information password necessary for accessing the setting information; however, some pieces of the setting information can have no setting information password.

In other words, the backup information is formed by encoding information including the setting information on each of the control devices 30-A, 30-B, . . . , the setting information password if it exists, and the device password if it exists with a whole password W as a key.

In this manner, the information on the individual control devices 30 is encoded using the individual passwords (the device password A in the case of the control device 30-A), the encoded information of the control devices 30, while the individual passwords are encoded as a whole with the whole password W to be the backup information. An end user is notified of only the whole password, thereby enabling the end user to perform the backup process of the system as a whole without putting the end user in an environment capable of browsing the setting information of individual control devices 30.

Next, returning to FIG. 1, explanation is made in detail of the configuration of the programmable display device 10 that stores in the portable storage medium 50 the setting information of the control devices 30 constituting the control system in the above form. The programmable display device 10 includes communication interfaces (represented as communication I/F in FIG. 1) 11-A to 11-X, communication drivers 12-A to 12-X, an external storage medium interface (represented as external storage medium I/F in FIG. 1) 13, a file system process unit 14, a display unit with input function 15, an operation and display process unit 16, a whole-password authentication process unit 17, an individual-password input process unit 18, and a setting-information obtaining/writing process unit 19.

The communication interfaces 11-A to 11-X are interfaces for communication with the control devices 30-A to 30-X such as programmable controllers and CNCs. In this example, the communication interfaces 11-A to 11-X are provided as many as the control devices 30-A to 30-X to be connected therewith, respectively.

The communication drivers 12-A to 12-X communicate with the control devices 30-A to 30-X connected via the communication interfaces 11-A to 11-X. The communication drivers 12-A to 12-X are prepared for the types of the control devices 30-A to 30-X, and therefore are not always provided as many as the control devices 30-A to 30-X. The communication interfaces 11-A to 11-X and the communication drivers 12-A to 12-X correspond to a communication process unit in the claims.

The external storage medium interface 13 is an interface for communication with the portable storage medium 50 such as a memory card or a USB memory.

The file system process unit 14 accesses the portable storage medium 50 connected to the external storage medium interface 13, and performs a file writing process or a file reading process based on an instruction from the later-described setting-information obtaining/writing process unit 19.

The display unit with input function 15 is formed by unifying an input unit and an output unit, and can be, for example, a liquid crystal display device with a touch panel. The display unit with input function 15 can be configured by separately providing the input unit and the output unit.

The operation and display process unit 16 displays predetermined information about the control devices 30 connected to the programmable display device 10, and receives operations input by a user from the display unit with input function 15.

In performing the backup or the restore, the whole-password authentication process unit 17 compares the input password input by a user from the display unit with input function 15 with the whole password stored in the portable storage medium 50 for the backup information encoded with the whole password, and authenticates whether the user is permitted to access.

When the backup/restore process of the setting information on each of the control devices 30-A to 30-X is performed after the whole password is determined to be authentic, the individual-password input process unit 18 sets the state in which the user can access the setting information of each of the control devices 30-A to 30-X by using the individual password (the device passwords, the setting information passwords) in the backup information.

The setting-information obtaining/writing process unit 19 has a function of performing the backup/restore process of the setting information on the control devices 30-A to 30-X based on an instruction from a user (an end user or a set maker). Specifically, when the setting-information obtaining/writing process unit 19 receives the instruction for the backup/restore from the user via the operation and display process unit 16, the setting-information obtaining/writing process unit 19 outputs an instruction for causing the operation and display process unit 16 to display a request asking the user to input the whole password. When the setting-information obtaining/writing process unit 19 receives the input password input from the display unit with input function 15, the setting-information obtaining/writing process unit 19 outputs an authentication instruction to the whole-password authentication process unit 17. Furthermore, when the user is determined to be authentic by the whole-password authentication process unit 17, the setting-information obtaining/writing process unit 19 performs the backup/restore of the setting information based on the backup/restore target information. At this time, the setting-information obtaining/writing process unit 19 outputs the instruction to the individual-password input process unit 18 to authenticate each of the control devices 30-A to 30-X, and thereafter instructs the communication drivers 12-A to 12-X and the file system process unit 14 to perform the reading process and the writing process of the setting information.

Next, each procedure of (1) first backup process, (2) backup process for the second time or later, and (3) restore process in the programmable display device 10 is explained in this order. In the explanation given below, it is assumed that the device password A is set for accessing the control device 30-A, and the device password is not set for accessing the control device 30-B.

(1) First Backup Process

In the backup process, when the first backup process is performed after a set maker constructs the control system as shown in FIG. 1, the backup process is performed for each of the control devices 30-A to 30-X, and the resultant setting information needs to be encoded as a whole. In other words, in the first backup process, the whole password needs to be set, so that the procedure is different from that of the backup process for the second time or later.

Figure 4:
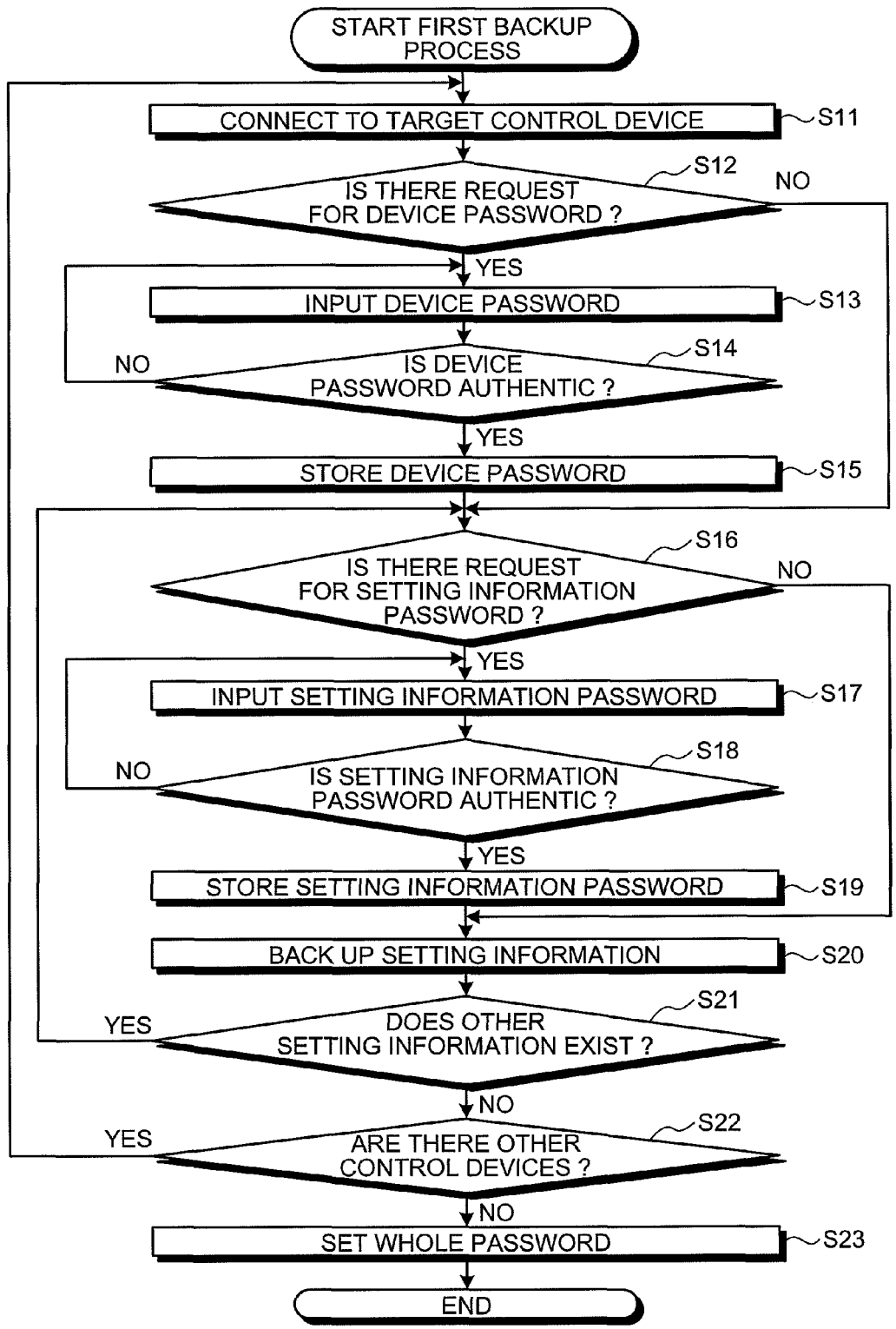
FIG. 4 is a flowchart of one example of a procedure of a first backup process.

FIG. 4 is a flowchart of one example of a procedure of the first backup process. First, when a request for performing the backup process is input by the user (the set maker) via the display unit with input function 15 after the user connects the portable storage medium 50 to the programmable display device 10, the operation and display process unit 16 sends the request for performing the backup process to the setting-information obtaining/writing process unit 19. The setting-information obtaining/writing process unit 19 judges whether the whole password for the control system is stored in the portable storage medium 50. If the whole password is not stored, the setting-information obtaining/writing process unit 19 judges that the backup process is to be performed for the first time. Thereafter, the processes in the flowchart shown in FIG. 4 are performed.

Next, the setting-information obtaining/writing process unit 19 sends to the file system process unit 14 an instruction to obtain the backup/restore target information from the portable storage medium 50. The file system process unit 14 accesses the portable storage medium 50 via the external storage medium interface 13 to obtain the backup/restore target information, and sends the obtained backup/restore target information to the setting-information obtaining/writing process unit 19. The setting-information obtaining/writing process unit 19 is connected to a selected one of the target control devices that are set in the backup/reset information (Step S11). At this time, the setting-information obtaining/writing process unit 19 is connected to the control device 30 via the communication driver 12 and the communication interface 11 corresponding to the target control device.

Next, the setting-information obtaining/writing process unit 19 judges whether there is a request for inputting the device password from the connected control device 30 (Step S12). If there is the request (Yes at Step S12), the operation and display process unit 16 causes the display unit with input function 15 to display a screen for requesting input of the device password, and waits for the user to input a password. When the user inputs the device password (Step S13), the setting-information obtaining/writing process unit 19 sends the password input by the user to the control device 30. The control device 30 judges whether the password matches the device password that is set for its own device, and sends the result to the setting-information obtaining/writing process unit 19.

The setting-information obtaining/writing process unit 19 judges whether the device password input by the user is determined to be authentic on the control device 30 side (Step S14). If the device password is determined to be not authentic (No at Step S14), the system control returns to Step S13. If the device password is determined to be authentic (Yes at Step S14), the device password input at Step S13 is stored in the portable storage medium 50 as the device password corresponding to the target control device name via the file system process unit 14 (Step S15).

Thereafter, or if there is no request for input of the device password at Step S12 (No at Step S12), the setting-information obtaining/writing process unit 19 outputs a request for obtaining the setting information to the control device 30. The setting information such as the control program or the control parameter that needs to be backed up in the control device 30 is specified in the request.

The setting-information obtaining/writing process unit 19 judges whether there is a request for inputting the setting information password from the connected control device 30 (Step S16). If there is the request for inputting the setting information password (Yes at Step S16), the operation and display process unit 16 causes the display unit with input function 15 to display a screen for inputting the setting information password, and waits for the user to input a password. When the user inputs the setting information password (Step S17), the setting-information obtaining/writing process unit 19 sends the password input by the user to the control device 30. The control device 30 judges whether the password matches the setting information password that is set for each piece of setting information, and sends the result to the setting-information obtaining/writing process unit 19.

The setting-information obtaining/writing process unit 19 judges whether the setting information password input by the user is determined to be authentic on the control device 30 side (Step S18). If the setting information password is determined to be not authentic (No at Step S18), the system control returns to Step S17. If the setting information password is determined to be authentic (Yes at Step S18), the setting information password input at Step S17 is stored in the portable storage medium 50 as the setting information password corresponding to the target setting information of the target control device name via the file system process unit 14 (Step S19). Thereafter, or if there is no request for setting information password at Step S16 (No at Step S16), the setting-information obtaining/writing process unit 19 obtains the setting information of the control device 30 defined in the backup/restore information from the control device 30, and backs up the setting information in the portable storage medium 50 via the file system process unit 14 (Step S20). At this time, the setting information is stored while being associated with the target control device name and the target setting information.

Thereafter, the setting-information obtaining/writing process unit 19 judges whether there exits other target setting information in the same target control device with reference to the backup/restore target information (Step S21). If other target setting information exists (Yes at Step S21), the system control returns to Step S16, and the above process is repeatedly performed until the backup is performed for all of the pieces of the target setting information of the same target control device.

If other target setting information does not exist (No at Step S21), the setting-information obtaining/writing process unit 19 judges whether there is other target control device with reference to the backup/restore target information (Step S22). If there is other target control devices (Yes at Step S22), the system control returns to Step S11, and the above process is repeatedly performed until the backup is performed for all of the target control devices in the backup/restore target information.

On the other hand, if there is no other target control device (No at Step S22), the setting-information obtaining/writing process unit 19 causes the display unit with input function 15 to display a screen for setting the whole password for encoding the backup information that includes all of the target control device names, the setting information, and the setting information passwords stored in the portable storage medium 50 in the above process via the operation and display process unit 16. When the user (the set maker) inputs the whole password, the setting-information obtaining/writing process unit 19 store the password input by the user in the portable storage medium 50 as the whole password (Step S23). Moreover, the setting-information obtaining/writing process unit 19 encodes the backup information by using the input whole password, and stores it in the portable storage medium 50. In this manner, the first backup process is finished. Both the set maker and the end user know the whole password set at Step S23.

(2) Backup Process for the Second Time or Later

Figure 5:
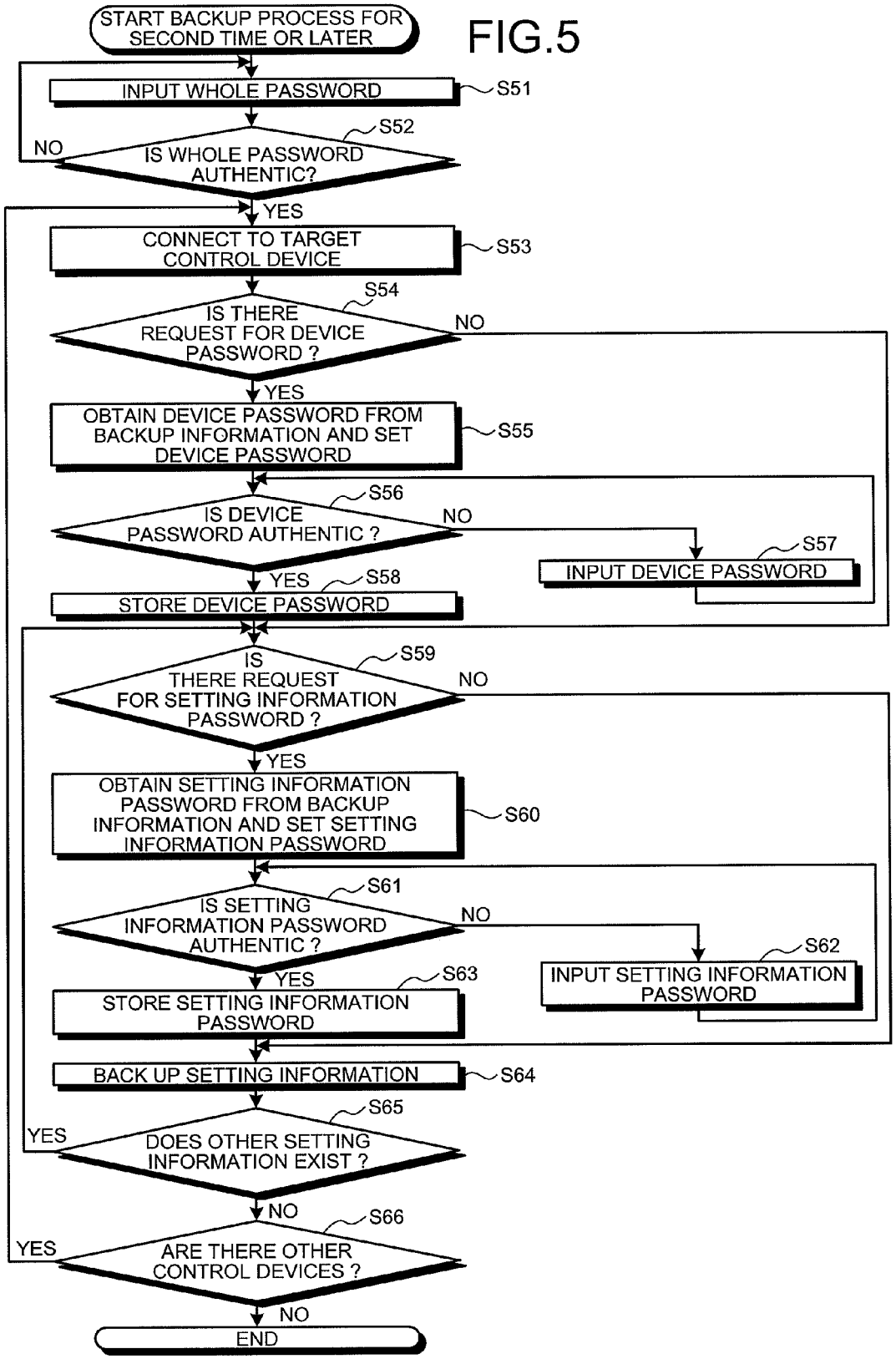
FIG. 5 is a flowchart of one example of a procedure of a backup process for the second time or later.
Figure 6:
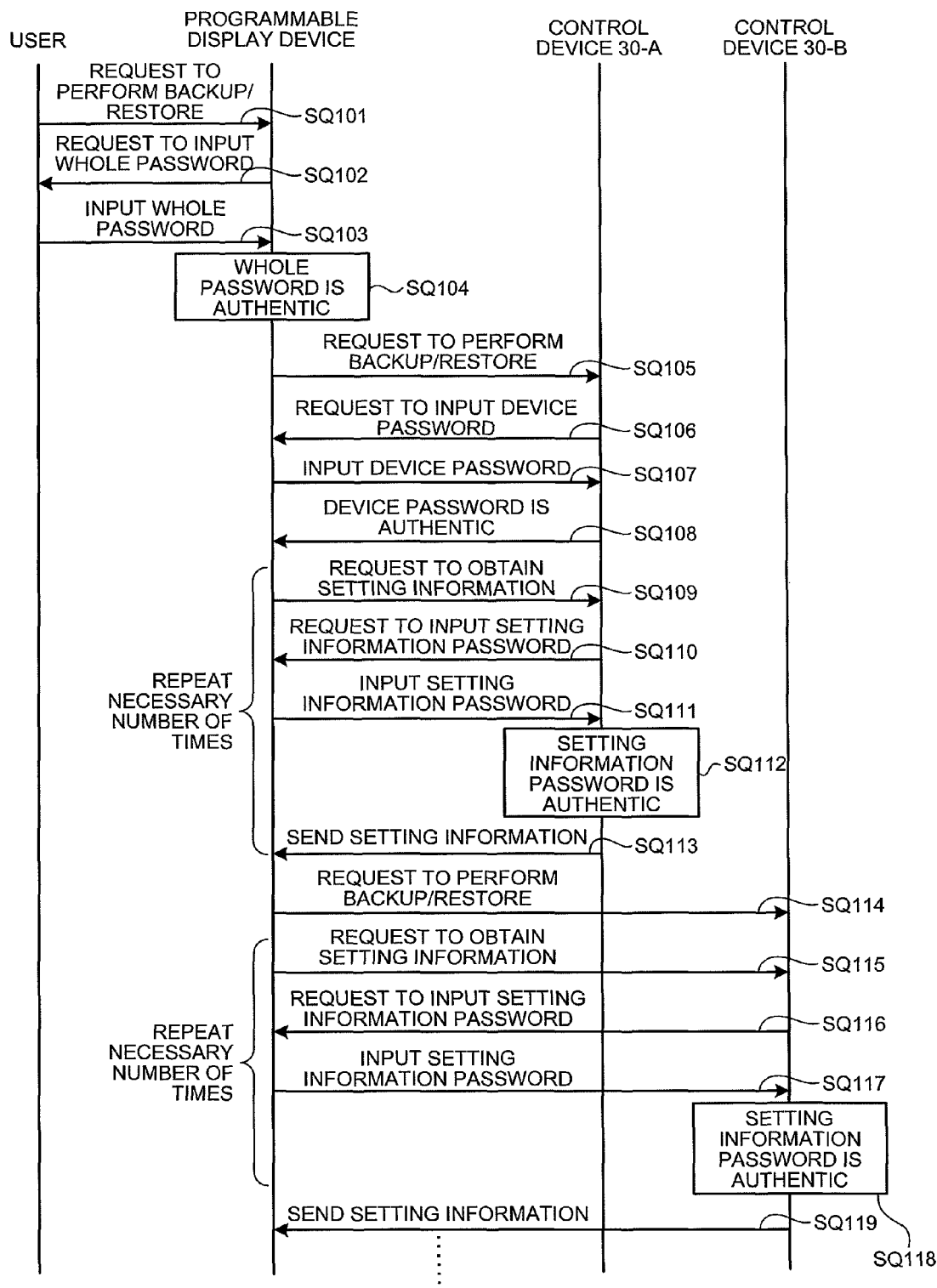
FIG. 6 is a sequence diagram of one example of a backup/restore process flow of setting information between the programmable display device and the control devices.

FIG. 5 is a flowchart of one example of a procedure of the backup process for the second time or later, and FIG. 6 is a sequence diagram representing one example of the backup/restore process flow of the setting information between the programmable display device and the control devices. The backup process for the second time or later is assumed to be performed by the end user; however, the set maker can also perform the backup process.

First, when a request for performing the backup process is input by the user (the end user or the set maker) via the display unit with input function 15 after the user mounts the portable storage medium 50 on the programmable display device 10 (SQ101), the operation and display process unit 16 sends the request for performing the backup process to the setting-information obtaining/writing process unit 19. The setting-information obtaining/writing process unit 19 judges whether the whole password for the control system has been stored in the portable storage medium 50. If the whole password has been stored, the setting-information obtaining/writing process unit 19 judges that the backup process is performed for the second time or later. Thereafter, the processes in the flowchart shown in FIG. 5 and in the sequence diagram shown in FIG. 6 are performed.

Then, the setting-information obtaining/writing process unit 19 causes the display unit with input function 15 to display a screen for requesting input of the whole password via the operation and display process unit 16 to urge the user to input the whole password (SQ102). When the user inputs the whole password (Step S51, SQ103), the whole-password authentication process unit 17 performs an authentication process in which the input password input by the user is compared with the whole password that has been stored in the portable storage medium 50 (Step S52). If the password is not authentic (No at Step S52), the system control returns to Step S51 to request the user to input the whole password again.

On the other hand, if the password is authentic (Yes at Step S52, SQ104), the programmable display device 10 is permitted to access the backup information in the portable storage medium 50. Thereafter, the setting-information obtaining/writing process unit 19 obtains the backup/restore information from the portable storage medium 50 via the file system process unit 14. Then, the setting-information obtaining/writing process unit 19 sends the backup request to the selected one of the target control devices that is set in the backup/restore information to be connected (Step S53, SQ105). At this time, the setting-information obtaining/writing process unit 19 is connected to the control device 30 via the communication driver 12 and the communication interface 11 corresponding to the target control device.

Next, the setting-information obtaining/writing process unit 19 judges whether there is a request for inputting the device password from the connected control device 30 (Step S54). If there is the request (Yes at Step S54, SQ106), the individual-password input process unit 18 obtains the device password corresponding to the selected target control device in the backup information of the portable storage medium 50, and sends the device password to the control device 30 (Step S55, SQ107). The control device 30 judges whether the password received from the programmable display device 10 matches the device password that is set for its own device, and sends the result to the setting-information obtaining/writing process unit 19.

The setting-information obtaining/writing process unit 19 judges whether the device password sent to the control device 30 is determined to be authentic on the control device 30 side (Step S56). If the device password is determined to be not authentic (No at Step S56), the setting-information obtaining/writing process unit 19 causes the display unit with input function 15 to display a screen for inputting the device password via the operation and display process unit 16 to urge the user to input the device password. When the user inputs the device password from the display unit with input function 15 (Step S57), the setting-information obtaining/writing process unit 19 sends the device password to the control device 30, and the system control returns to the process at Step S56.

If the device password is authentic (Yes at Step S56, SQ108), the device password set at Step S55 or Step S57 is stored in the portable storage medium 50 as the device password corresponding to the target control device name via the file system process unit 14 (Step S58).

Thereafter, or if there is no request for device password at Step S54 (No at Step S54), the setting-information obtaining/writing process unit 19 outputs a request for obtaining the setting information to the control device 30 (SQ109). The setting information such as the control program or the control parameter that needs to be backed up in the control device 30 is specified in the setting information obtaining request.

The setting-information obtaining/writing process unit 19 judges whether there is a request for inputting the setting information password from the connected control device 30 (Step S59). If there is the request for inputting the setting information password (Yes at Step S59, SQ110), the individual-password input process unit 18 obtains the setting information password corresponding to the combination of the selected target control device and the target setting information in the backup information of the portable storage medium 50, and sends the setting information password to the control device 30 (Step S60, SQ111). The control device 30 judges whether the setting information password received from the programmable display device 10 matches the setting information password that has been set for its own device, and sends the result to the setting-information obtaining/writing process unit 19.

The setting-information obtaining/writing process unit 19 judges whether the setting information password sent to the control device 30 is determined to be authentic on the control device 30 side (Step S61). If the setting information password is determined to be not authentic (No at Step S61), the setting-information obtaining/writing process unit 19 causes the display unit with input function 15 to display a screen for inputting the setting information password via the operation and display process unit 16 to urge the user to input the setting information password. When the user inputs the setting information password from the display unit with input function 15 (Step S62), the setting-information obtaining/writing process unit 19 sends the value to the control device 30, and the system control returns to the process at Step S61.

If the setting information password is determined to be authentic (Yes at Step S61, SQ112), the setting information password set at Step S60 or Step S62 is stored in the portable storage medium 50 while being associated with the combination of the target control device name and the setting information via the file system process unit 14 (Step S63).

Thereafter, or if there is no request for setting information password at Step S59 (No at Step S59), the setting-information obtaining/writing process unit 19 obtains the setting information of the control device 30 defined in the backup/restore information from the control device 30, and backs up the setting information in the portable storage medium 50 via the file system process unit 14 (Step S64, SQ113). At this time, the setting information is stored while being associated with the target control device name and the target setting information.

Thereafter, the setting-information obtaining/writing process unit 19 judges whether there exists other target setting information in the same target control device with reference to the backup/restore target information (Step S65). If other target setting information exists (Yes at Step S65), the system control returns to Step S59, and the above process is repeatedly performed until the backup is performed for all of the pieces of the target setting information of the same target control device (SQ109 to SQ113).

If other target setting information does not exist (No at Step S65), the setting-information obtaining/writing process unit 19 judges whether there exists other target control device information with reference to the backup/restore target information (Step S66). If other target control device information exists (Yes at Step S66), the system control returns to Step S53, and the above process is repeatedly performed until the backup is performed for all of the target control devices in the backup/restore target information (SQ114 to SQ119). If other target control device information does not exist (No at Step S66), the backup process for the second time or later is finished.

(3) Restore Process

Figure 7:
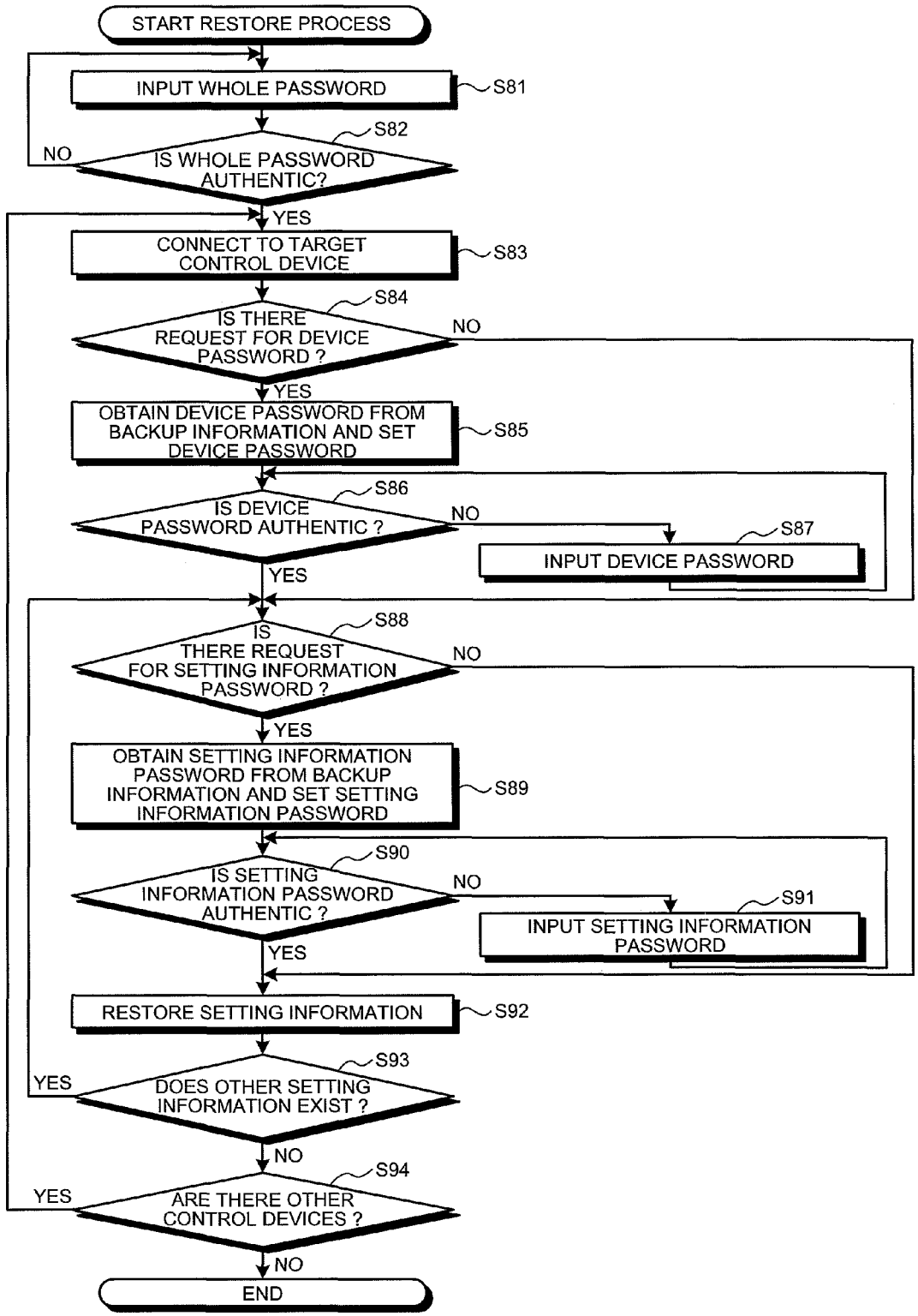
FIG. 7 is a flowchart representing one example of a procedure of the restore process.

FIG. 7 is a flowchart of one example of a procedure of the restore process. FIG. 6 is a sequence diagram representing one example of the backup/restore process flow of the setting information between the programmable display device and the control devices. The restore process is assumed to be performed by the end user; however, the set maker can also perform the restore process.

First, in the same manner as Steps S51 to S57 shown in FIG. 5, the user (the end user or the set maker) is authenticated by using the whole password, and the backup/restore target information is obtained from the portable storage medium 50. Thereafter, the setting-information obtaining/writing process unit 19 is connected to the target control device selected in the backup/reset target information. If the target control device is the control device 30 that needs a device password for access, the individual-password input process unit 18 obtains the device password from the backup information, and sends it to the control device 30 for the authentication process (Step S81 to Step S87, SQ101 to SQ107). If the device password of the control device 30 provided at the time of the backup is different from that provided at the time of the restore, it means that the device password stored in the backup information is not authentic (No at Step S86), so that the authentication is performed by the user directly inputting the device password from the display with input function (Step S87).

Next, if there is a device password and the device password is authentic (Yes at Step S86, SQ108), the authentication process is performed to access the target setting information of the target control device selected in the backup/reset target information (Step S88 to Step S91, SQ109 to SQ111) in the same manner as Steps S59 to S62 shown in FIG. 5. At this time, again, if the setting information password provided at the time of the backup is different from that provided at the time of the restore, it means that the setting information password stored in the backup information is not authentic (No at Step S90), so that the authentication is performed by the user directly inputting the setting information password from the display with input function (Step S91).

Thereafter, if there is a setting information password and the setting information password is authentic (Yes at Step S90, SQ112), the setting-information obtaining/writing process unit 19 obtains the target setting information specified by the combination of the target control device name and the setting information password in the backup information from the portable storage medium 50 via the file system process unit 14. Then, the setting-information obtaining/writing process unit 19 restores it in the target control device specified by the combination of the target control device information and the target setting information in the backup-restore target (Step S92, SQ113).

Thereafter, the setting-information obtaining/writing process unit 19 judges whether there exists other target setting information in the same target control device information with reference to the backup/restore target information (Step S93). If other target setting information exists (Yes at Step S93), the system control returns to Step S88, and the above process is repeatedly performed until the restore is performed for all of the pieces of the target control information of the same target control device information (SQ109 to SQ113).

If other target setting information does not exist (No at Step S93), the setting-information obtaining/writing process unit 19 judges whether there exists other target control device information with reference to the backup/restore target information (Step S94). If other target control device information does not exist (Yes at Step S94), the system control returns to Step S83, and the above process is repeatedly performed until the restore is performed for all of the target control devices in the backup/restore target information (SQ114 to SQ119). If other target control device information does not exist (No at Step S94), the restore process is finished.

According to the present embodiment, the backup/restore process is performed after performing the authentication of the setting information of each of the control devices 30-A to 30-X in the programmable display device 10 by using individual passwords stored in the backup information. Therefore, there is no need to disclose the individual passwords corresponding to the setting information of each of the control devices 30-A to 30-X to an end user. Moreover, the setting information of any of the control devices 30-A to 30-X that is connected to the programmable display device 10 in accordance with the desire of an end user can be simultaneously backed up at once.

Two (types) passwords are prepared in this manner, i.e., the individual passwords and the whole password, and both the individual passwords and the whole password are disclosed to a set maker who constructs a system by combining a plurality of the control devices 30-A to 30-X in accordance with the desire of an end user while only the whole password is given to an end user who wants to back up or restore the setting information of the control devices 30-A to 30-X constituting the system. Therefore, it is possible to prevent an unauthorized leak or a falsification of the setting information. In the above explanation, the portable storage medium 50 is used for storing data containing the backup information and the whole password; however, a storage medium built in the programmable display device 10 can be used.

INDUSTRIAL APPLICABILITY

As above, the programmable display device according to the present invention is connected to one or a plurality of control devices, and is useful for backing up or restoring the setting information of each control device the content of which needed to be protected.

The invention claimed is:

1. A programmable display device that is connected to Programmable Logic Controller (PLC) control devices that store setting information for performing a predetermined control process and perform the control process based on the setting information, and perform a backup or restore process of the setting information, the programmable display device comprising:
   a communication process unit that accesses the PLC control devices executing sequence programs;
   a file system process unit that accesses a storage medium that stores therein first information including target control device information for one of the PLC control devices and target setting information and is built in or detachable from the programmable display device, the target control device information specifying a PLC control device selected from the PLC control devices that is to be a target for the backup or restore process out of the PLC control devices connected to the programmable display device, the target setting information specifying setting information that is to be a target for the backup or restore process out of a plurality of pieces of setting information stored in the PLC control device specified in the target control device information;
   a setting information obtaining/writing process unit that accesses the PLC control device via the communication process unit based on the first information in the storage medium in accordance with a request for performing the backup or restore process from outside, and performs the backup or restore process of the setting information by accessing the storage medium via the file system process unit;

wherein the storage medium stores therein a whole password, an individual password, and second information in which access to setting information of target PLC control devices specified in the first information is limited by the whole password, and the second information includes setting information of each of the PLC control devices to which access is limited by the individual password, and wherein the setting information of the target PLC control devices are protected by a respective individual password and wherein the whole password authorizes the backup or restore of each of the target PLC control devices.

2. The programmable display device according to claim 1, wherein:

the programmable display device further includes:
a whole password authentication process unit that performs authentication of a password that is input from outside when performing the backup or restore by comparing the password with the whole password in the storage medium; and
an individual password input process unit that performs an authentication process with respect to the target PLC control device by obtaining the individual password corresponding to the target setting information in the first information from the second information when the authentication is performed normally by the whole password authentication process unit, the setting information obtaining/writing process unit performs the backup or restore process of setting information specified by the target setting information after the authentication process is normally performed by the individual password input process unit.

3. The programmable display device according to claim 2, wherein the second information further includes a setting information password for authenticating access to each of the setting information, and the individual password input process unit obtains a setting information password corresponding to the target setting information in the first information from the second information, and performs an authentication process to the target PLC control device.

4. The programmable display device according to claim 2, wherein the whole password and the individual password are written on the storage medium by the setting information obtaining/writing process unit at a time of the backup process for a first time.

5. A control system that performs a backup or restore process of setting information of a Programmable Logic Controller (PLC) control device, the control system comprising:

PLC control devices that execute sequence programs and store therein setting information for performing a predetermined control process and perform the control process based on the setting information;

a programmable display device that is connected to the PLC control devices and displays a state of the control devices and a display screen including a setting screen for the PLC control devices; and a storage medium that is built in or detachable from the programmable display device, wherein the storage medium stores therein first information including target control device information and target setting information, the target control device information specifying a PLC control device that is to be a target for the backup or restore process out of the control devices connected to the programmable display device, the target setting information specifying setting information that is to be a target for the backup or restore process out of a plurality of pieces of setting information stored in the PLC control device specified in the target control device information, and the programmable display device includes:
a communication process unit that accesses the PLC control device;
a file system process unit that accesses the storage medium; and
a setting information obtaining/writing process unit that accesses the PLC control device via the communication process unit based on the first information in the storage medium in accordance with a request for performing the backup or restore process from outside, and performs the backup or restore process of the setting information by accessing the storage medium via the file system process unit, wherein the storage medium stores therein a whole password, an individual password, and second information in which access to setting information of target PLC control devices specified in the first information is limited by the whole password, and the second information includes setting information of each of the PLC control devices to which access is limited by the individual password, and wherein the setting information of the target PLC control devices are protected by a respective individual password and wherein the whole password authorizes the backup or restore of each of the target PLC control devices.

6. The control system according to claim 5, wherein:

the programmable display device further includes:
a whole password authentication process unit that performs authentication of a password that is input from outside when performing the backup or restore by comparing the password with the whole password in the storage medium; and
an individual password input process unit that performs an authentication process with respect to the target control device by obtaining the individual password corresponding to the target setting information in the first information from the second information when the authentication is performed normally by the whole password authentication process unit, the setting information obtaining/writing process unit of the programmable display device performs the backup or restore process of setting information specified by the target setting information after the authentication process is normally performed by the individual password input process unit.

7. The control system according to claim 6, wherein the second information further includes a setting information password for authenticating access to each of the setting information, and the individual password input process unit obtains a setting information password corresponding to the target setting information in the first information from the second information, and performs an authentication process to the target control device.

8. The control system according to claim 6, wherein the whole password and the individual password are written on the storage medium by the setting information obtaining/writing process unit at a time of the backup process for a first time.

9. The programmable display device according to claim 1, wherein the whole password provides access to each of the target PLC control devices and wherein during subsequent backup operation or restoration process using the whole password, individual password for at least one of the PLC control device is obtained to allow said subsequent backup operation or restoration process.

10. The programmable display device according to claim 1, wherein the individual passwords authorize modifiable access to the setting information of the respective PLC control device and wherein the whole password authorizes view access without modifications of the setting information.

11. The programmable display device according to claim 1, the programmable display device is a numeric controller.

* * * * *